United States Patent
Li et al.

(10) Patent No.: US 7,394,947 B2
(45) Date of Patent: Jul. 1, 2008

(54) SYSTEM AND METHOD FOR AUTOMATIC LINGUISTIC INDEXING OF IMAGES BY A STATISTICAL MODELING APPROACH

(75) Inventors: Jia Li, State College, PA (US); James Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 996 days.

(21) Appl. No.: 10/820,948

(22) Filed: Apr. 8, 2004

(65) Prior Publication Data

US 2004/0225686 A1  Nov. 11, 2004

Related U.S. Application Data

(60) Provisional application No. 60/461,391, filed on Apr. 8, 2003.

(51) Int. Cl.
*G06K 9/55* (2006.01)
*G06K 9/62* (2006.01)
*G06F 7/10* (2006.01)
*G06F 12/00* (2006.01)

(52) U.S. Cl. ............... 382/305; 382/228; 707/104.1; 711/100

(58) Field of Classification Search ......... 382/159–160, 382/162, 173, 224–231, 278, 298–300, 305, 382/312; 707/36, 104.1; 345/864; 711/100
See application file for complete search history.

(56) References Cited

U.S. PATENT DOCUMENTS

| 7,043,474 | B2 * | 5/2006 | Mojsilovic et al. ............ 707/6 |
| 7,124,149 | B2 * | 10/2006 | Smith et al. ............. 707/104.1 |
| 7,194,134 | B2 * | 3/2007 | Bradshaw ................ 382/226 |
| 7,215,828 | B2 * | 5/2007 | Luo ........................ 382/289 |
| 2004/0100510 | A1 * | 5/2004 | Milic-Frayling et al. .... 345/864 |

OTHER PUBLICATIONS

Jia Li and James Z. Wang, "Studying Digital Imagery of Ancient Paintings by Mixtures of Stochastic Models," IEEE Transactions on Image Processing, vol. 13, No. 3, pp. 340-353, 2004.
Jia Li and James Z. Wang, "Automatic Linguistic Indexing of Pictures by a Statistical Modeling Approach," IEEE Transactions on Pattern Analysis and Machine Intelligence, vol. 25, No. 9, pp. 1075-1088, 2003.
Yixin Chen and James Z. Wang, "Support Vector Learning for Fuzzy Rule-Based Classification Systems," IEEE Transactions on Fuzzy Systems, vol. 11, No. 6, pp. 716-728, 2003.
James Z. Wang, Jia Li and Sui Ching Lin, "Evaluation Strategies for Automatic Linguistic Indexing of Pictures," Proceedings of the IEEE International Conference on Image Processing (ICIP), vol. 3, pp. 617-620, Barcelona, Spain, IEEE, Sep. 2003.

(Continued)

*Primary Examiner*—Kanjibhai Patel
(74) *Attorney, Agent, or Firm*—Gifford, Krass, Sprinkle, Anderson & Citkowski, P.C.

(57) ABSTRACT

The present invention provides a statistical modeling approach to automatic linguistic indexing of photographic images. The invention uses categorized images to train a dictionary of hundreds of statistical models each representing a concept. Images of any given concept are regarded as instances of a stochastic process that characterizes the concept. To measure the extent of association between an image and a textual description associated with a predefined concept, the likelihood of the occurrence of the image based on the characterizing stochastic process is computed. A high likelihood indicates a strong association between the textual description and the image. The invention utilizes two-dimensional multi-resolution hidden Markov models that demonstrate accuracy and high potential in linguistic indexing of photographic images.

26 Claims, 11 Drawing Sheets

OTHER PUBLICATIONS

Yixin Chen, James Z. Wang and Robert Krovetz, "An Unsupervised Learning Approach to Content-Based Image Retrieval," Proceedings of the IEEE International Symposium on Signal Processing and its Applications, vol. 1, pp. 197-200, Paris, France, Jul. 2003.

Yixin Chen and James Z. Wang, "Kernel Machines and Additive Fuzzy Systems: Classification and Function Approximation," Proceedings of the IEEE International Conference on Fuzzy Systems, pp. 789-795, St. Louis, MO, 2003.

Yixin Chen and James Z. Wang, "Looking Beyond Region Boundaries: A Robust Image Similarity Measure Using Fuzzified Region Features," Proceedings of the IEEE International Conference on Fuzzy Systems, pp. 1165-1170, St. Louis, MO, 2003.

Yixin Chen, James Z. Wang and Robert Krovetz, "Content-Based Image Retrieval by Clustering," Proceedings of the 5th International Workshop on Multimedia Information Retrieval, in conjuction with ACM Multimedia, pp. 193-200, Berkeley, CA, ACM, Nov. 2003.

James Z. Wang, Jia Li and Ching-chih Chen, "Machine Annotation for Digital Imagery of Historical Materials Using the ALIP System," Proceedings of the DELOS-NSF Workshop on Multimedia in Digital Libraries, 5 pages, Crete, Greece, 2003. In e-proceedings.

Yixin Chen and James Z. Wang, "A Region-Based Fuzzy Feature Matching Approach to Content-Based Image Retrieval," IEEE Transactions on Pattern Analysis and Machine Intelligence, vol. 24, No. 9, pp. 1252-1267, 2002.

James Z. Wang and Jia Li, "Learning-Based Linguistic Indexing of Pictures with 2-D MHMMs," Proceedings of the ACM Multimedia Conference, pp. 436-445, Juan Les Pins, France, ACM, Dec. 2002.

Ching-chih Chen and James Z. Wang, "Large-Scale Emperor Digital Library and Semantics-Sensitive Region-Based Retrieval," Proceedings of the International Conference on Digital Library—IT Opportunities and Challenges in the New Millennium, pp. 454-462, Beijing, China, Jul. 9-11, 2002.

James Z. Wang, Jia Li and Ching-chih Chen, "Interdisciplinary Research to Advance Digital Imagery Indexing and Retrieval Technologies for Asian Art and Cultural Heritages," Proceedings of the 4th International Workshop on Multimedia Information Retrieval, in conjunction with ACM Multimedia, 6 pages, Juan Les Pins, France, ACM, Dec. 2002.

James Z. Wang and Jia Li, "Mining Digital Imagery Data for Automatic Linguistic Indexing of Pictures," Proceedings of the NSF Workshop on Next Generation Data Mining, pp. 69-76, Baltimore, MD, Nov. 2002.

DELOS-NSF Working Group, "Research on Digital Imagery for Significant Cultural and Historical Materials," DELOS-NSF Working Group Reports, 19 pages, Boston, MA, Dec. 2002.

James Z. Wang, Jia Li and Gio Wiederhold, "SIMPLIcity: Semantics-Sensitive Integrated Matching for Picture Libraries," IEEE Transactions on Pattern Analysis and Machine Intelligence, vol. 23, No. 9, pp. 947-963, 2001.

James Z. Wang, Jia Li, Robert M. Gray and Gio Wiederhold, "Unsupervised Multiresolution Segmentation for Images with Low Depth of Field," IEEE Transactions on Pattern Analysis and Machine Intelligence, vol. 23, No. 1, pp. 85-90, 2001.

Yanping Du and James Z. Wang "A Scalable Integrated Region-Based Image Retrieval System," Proceedings of the IEEE International Conference on Image Processing (ICIP), Thessaloniki, Greece, pp. 22-25, IEEE, Oct. 2001.

Yixin Chen, James Z. Wang and Jia Li, "FIRM: Fuzzily Integrated Region Matching for Content-Based Image Retrieval," Proceedings of the ACM Multimedia Conference, pp. 543-545, Ottawa, Canada, ACM, Sep. 2001.

James Z. Wang, "Security Filtering of Medical Images Using OCR," Digital Libraries: Advanced Methods and Technologies, Digital Collections, Proceedings of the Third All-Russian Scientific Conference, pp. 118-122, Petrozavodsk, Russia, Sep. 2001.

James Z. Wang and Yanping Du, "RF IPF: A Weighting Scheme for Multimedia Information Retrieval," Proceedings of the IEEE International Conference on Image Analysis and Processing (ICIAP), pp. 380-385, Palermo, Italy, IEEE, 2001.

James Z. Wang and Yanping Du, "Scalable Integrated Region-Based Image Retrieval Using IRM and Statistical Clustering," Proceedings of the ACM and IEEE Joint Conference on Digital Libraries, pp. 268-277, Roanoke, VA, ACM, Jun. 2001.

Yixin Chen and James Z. Wang, "Looking Beyond Region Boundaries: Region-Based Image Retrieval Using Fuzzy Feature Matching," Proceedings of the Multimedia Content-Based Indexing and Retrieval Workshop, INRIA Rocquencourt, France, pp. 37-40, Sep. 2001.

James Z. Wang, Jia Li and Gio Wiederhold, "SIMPLIcity: Semantics-Sensitive Integrated Matching for Picture Libraries," Lecture Notes in Computer Science, Advances in visual information systems, Lyon, France, Robert Laurini (ed.), vol. 1929, pp. 360-371, Springer-Verlag, Nov. 2000.

James Z. Wang, "Pathfinder: Multiresolution Region-Based Searching of Pathology Images Using IRM," Journal of the American Medical Informatics Association, Proceedings of the AMIA Annual Symposium, vol. 2000 symposium suppl., pp. 883-887, Los Angeles, CA, Nov. 2000.

James Z. Wang, "SIMPLIcity: A Region-Based Image Retrieval System for Picture Libraries and Biomedical Image Databases," Proceedings of the ACM Multimedia Conference, pp. 483-484, Los Angeles, CA, ACM, Oct. 2000.

James Z. Wang, "Region-Based Retrieval of Biomedical Images," Proceedings of the ACM Multimedia Conference, pp. 511-512, Los Angeles, CA, ACM, Oct. 2000.

Jia Li, James Z. Wang and Gio Wiederhold, "IRM: Integrated Region Matching for Image Retrieval," Proceedings of the ACM Multimedia Conference, pp. 147-156, Los Angeles, CA, ACM, Oct. 2000.

Jia Li, James Z. Wang and Gio Wiederhold, "Classification of Textured and Non-Textured Images Using Region Segmentation," Proceedings of the IEEE International Conference on Image Processing (ICIP), Vancouver, BC, Canada, pp. 754-757, IEEE, Sep. 2000.

* cited by examiner

FIG - 3

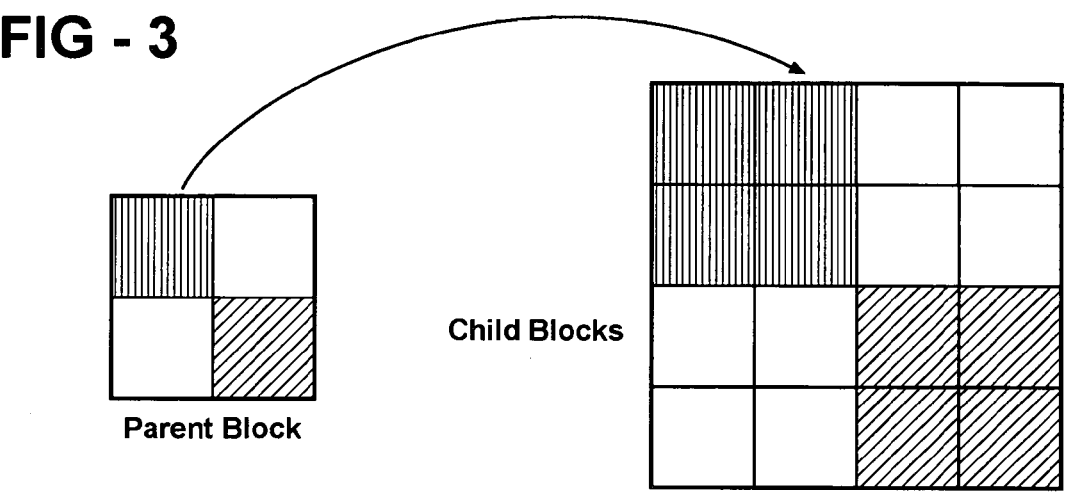

Parent Block    Child Blocks

FIG - 6

| ID | Category Descriptions |
|---|---|
| 0 | Africa, people landscape, animal |
| 10 | England, landscape, mountain, lake European, people, historical building |
| 20 | Monaco, Ocean, historical building, food, European, people |
| 30 | royal guard, England, European, people |
| 40 | vegetable |
| 50 | wildlife, young animal, animal, grass |
| ⋮ | |
| 100 | painting, European |
| ⋮ | |
| 200 | fractal, man-made, texture |
| ⋮ | |
| 300 | St. Moritz, ski, snow, ice, people |
| ⋮ | |
| 400 | Canada, landscapes, historical building |
| ⋮ | |
| 500 | owl, wildlife, bird |
| ⋮ | |
| 590 | woman, face, female, people |
| ⋮ | |

FIG - 5A
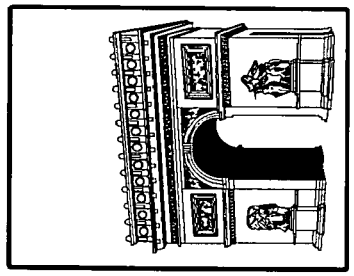
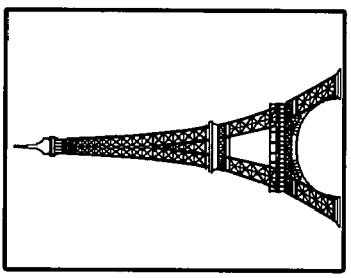
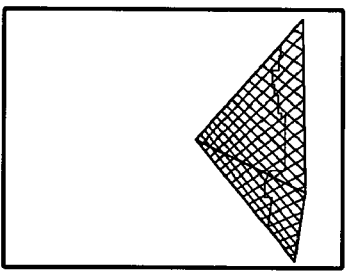
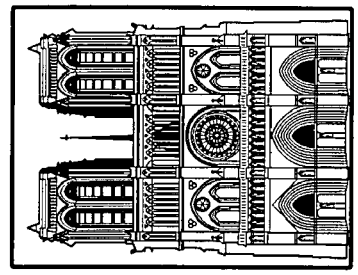
FIG - 5B

| % | Africa | beach | buildings | buses | dinosaurs | elephants | flowers | horses | mountains | food |
|---|---|---|---|---|---|---|---|---|---|---|
| Africa | 70 | 2 | 6 | 2 | 0 | 14 | 0 | 0 | 0 | 6 |
| beach | 0 | 74 | 2 | 0 | 0 | 4 | 2 | 0 | 18 | 0 |
| buildings | 6 | 2 | 86 | 0 | 0 | 2 | 0 | 0 | 2 | 2 |
| buses | 0 | 6 | 0 | 92 | 0 | 0 | 0 | 0 | 0 | 2 |
| dinosaurs | 0 | 0 | 0 | 0 | 98 | 0 | 0 | 0 | 2 | 0 |
| elephants | 2 | 0 | 2 | 0 | 0 | 82 | 0 | 8 | 2 | 4 |
| flowers | 2 | 0 | 0 | 0 | 0 | 0 | 98 | 0 | 0 | 0 |
| horses | 0 | 0 | 0 | 0 | 0 | 0 | 0 | 98 | 2 | 0 |
| mountains | 0 | 10 | 6 | 0 | 0 | 2 | 0 | 0 | 82 | 0 |
| food | 10 | 6 | 0 | 2 | 2 | 0 | 0 | 0 | 2 | 78 |

| Accuracy | 11.88% | 17.06% | 20.76% | 23.24% | 26.05% |
|---|---|---|---|---|---|
| Number of Top-ranked Categories Required by ALIP | 1 | 2 | 3 | 4 | 5 |
| Number of Categories Required by a Random Selection Scheme | 72 | 103 | 125 | 140 | 151 |

SYSTEM AND METHOD FOR AUTOMATIC LINGUISTIC INDEXING OF IMAGES BY A STATISTICAL MODELING APPROACH

RELATED APPLICATION

This application claims benefit of U.S. provisional patent application Ser. No. 60/461,391, filed Apr. 8, 2003, which is incorporated herein in its entirety by reference.

FIELD OF THE INVENTION

The present invention relates to linguistic indexing of images. More particularly, the invention provides a system and method for automatic linguistic indexing of images that associates statistical models with semantic concepts wherein features extracted from images to be indexed are compared to the statistical models to facilitate the linguistic indexing process.

BACKGROUND OF THE INVENTION

A picture is worth a thousand words. As human beings, we are able to tell a story from a picture based on what we have seen and what we have been taught. A 3-year old child is capable of building models of a substantial number of concepts and recognizing them using the learned models stored in his or her brain. Hence, from a technological stance, it is appreciated that a computer program may be adapted to learn a large collection of semantic concepts from 2-D or 3-D images, build models about these concepts, and recognize these concepts based on these models.

Automatic linguistic indexing of pictures is essentially important to content-based image retrieval and computer object recognition. It can potentially be applied to many areas including biomedicine, commerce, the military, education, digital libraries, and Web searching. Decades of research have shown that designing a generic computer algorithm that can learn concepts from images and automatically translate the content of images to linguistic terms is highly difficult. Much success has been achieved in recognizing a relatively small set of objects or concepts within specific domains.

Many content-based image retrieval (CBIR) systems have been developed. Most of the CBIR projects were aimed at general-purpose image indexing and retrieval systems that focused on searching images visually similar to the query image or a query sketch. These systems were not adapted to have the capability of assigning comprehensive textual descriptions automatically to pictures, i.e., linguistic indexing, because of the great difficulty in recognizing a large number of objects. However, this function is essential for linking images to text and consequently broadening the possible usages of an image database.

Many researchers have attempted to use machine learning techniques for image indexing and retrieval. One such system included a learning component wherein the system internally generated many segmentations or groupings of each image's regions based on different combinations of features, then learned which combinations best represented the semantic categories provided as examples by the user. The system required the supervised training of various parts of the image.

A growing trend in the field of image retrieval is to automate linguistic indexing of images by statistical classification methods to group images into rough semantic classes or categories, such as textured-nontextured, graph-photograph. Potentially, the categorization enhances retrieval by permitting semantically-adaptive searching methods and by narrowing down the searching range in a database. The approach is limited because these classification methods are problem specific and do not extend straightforwardly.

Prior art methods for associating images explicitly with words have one major limitation in that the algorithm used with these methods relies on semantically meaningful segmentation, which is generally unavailable to image databases. Thus there is a need for a system and method of automatic linguistic indexing of images that overcomes the above disadvantage relative to segmentation and wherein the system provides scalability that allows for a large number of categories to be trained at once.

SUMMARY OF THE INVENTION

The present invention provides a system and method that automates linguistic indexing of images wherein categories of images, each corresponding to a distinct concept, are profiled and represented by statistical models. Each statistical model is thereafter associated with a textual description of the concept that it represents.

The method begins by establishing a database of statistical models using a statistical modeling process accessible by a computer wherein each of the statistical models represents a different semantic category.

The method advances with associating a set of index terms with one of each of the statistical models wherein the set of index terms operate to describe the semantic category represented by the statistical model.

The method advances by extracting a plurality of feature vectors from an image to be indexed and statistically comparing the plurality of feature vectors with the established statistical models.

The method continues with providing a set of statistical models that are determined to be statistically similar to the plurality of feature vectors extracted from the image to be indexed and then extracting a set of statistically significant index terms from the set of statistical models. The set of statistically significant indexed terms are assigned to the image thus providing the image with a description. One advantage of the present invention is that images are automatically indexed. Another advantage of the present invention is that it does not rely on semantically meaningful segmentation of images. A further advantage of the invention is that it allows large numbers of categories to be trained simultaneously. A still further advantage is that the invention allows for large numbers of images to be linguistically indexed simultaneously.

BRIEF DESCRIPTION OF THE DRAWINGS

A better understanding of the present invention will be had upon reference to the following detailed description when read in conjunction with the accompanying drawings in which like parts are given like reference numerals and wherein:

FIG. 3 illustrates a diagrammatic view of the image hierarchy across resolutions assigned during the multi-resolution process as according to the invention;

FIGS. 5A and 5B illustrate a diagrammatic view of distinct groups of training images used to train a given concept as according to the invention;

FIG. 6 illustrates a table of a plurality of distinct textual descriptions associated with the various categories of the training database as according to the invention;

FIGS. 9A-9C illustrate a diagrammatic view of three test images wherein 9A is annotated with only one word and FIGS. 9B and C are annotated with fourteen words each by using the automatic linguistic indexing process as according to the invention;

DETAILED DESCRIPTION OF THE INVENTION

Figure 1:
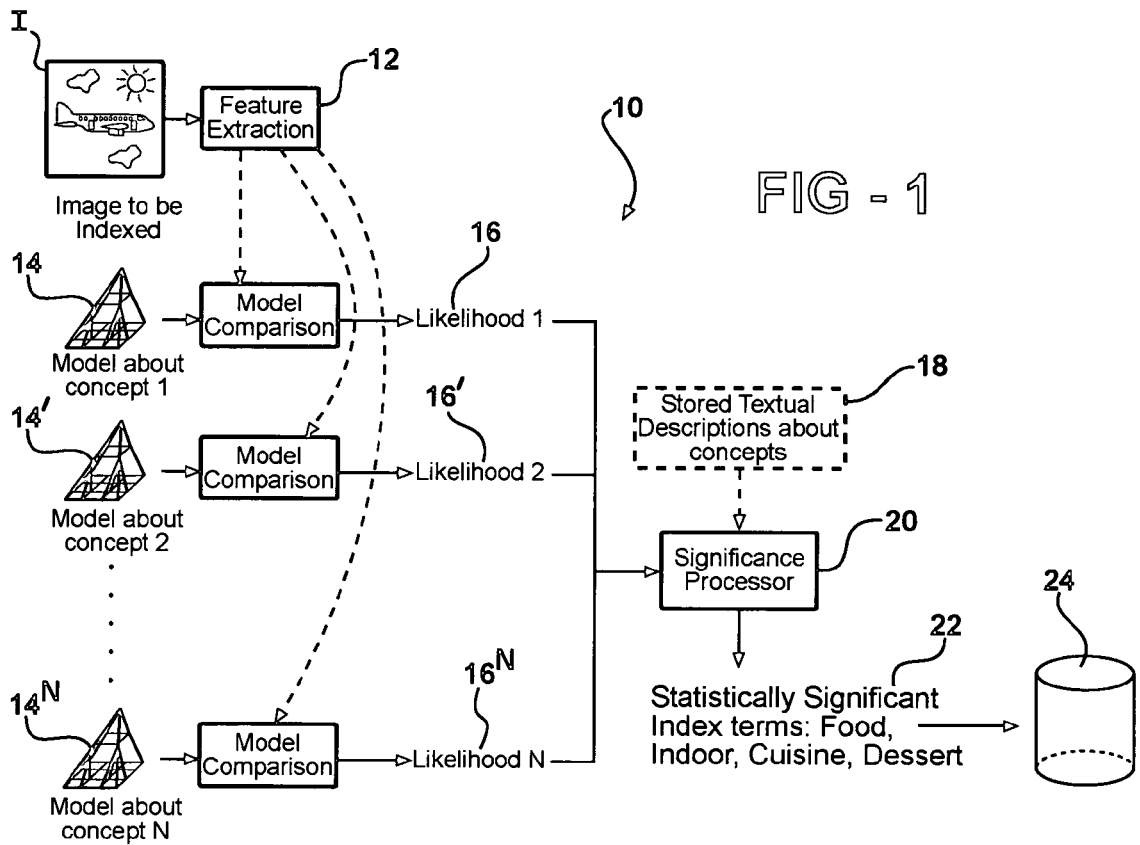
FIG. 1 illustrates a diagrammatic view of the statistical linguistic indexing process for assigning a textual description to a test image as according to the invention.

Referring to FIGS. 1-14, the present invention provides a computer system adapted to learn a large collection of semantic concepts using of a plurality of images, build statistical models about these concepts, and recognize these concepts based on the statistical models. Advantageously, the invention is operative to learn a plurality of images, build statistical models for the images, and recognize the images based on the statistical models of the images.

It should be appreciated that in this embodiment a statistical model is generated. As best illustrated in the block diagram of FIG. 13, the method of the present invention has three major components, the feature extraction process 50, the multi-resolution statistical modeling process 60, and the statistical linguistic indexing process 70. The feature extraction process involves using a statistical model.

Pictorial information of each image is summarized by a collection of feature vectors extracted at multiple resolutions and spatially arranged on a pyramid grid. A statistical model, preferably a two-dimensional multi-resolution hidden Markov model (2-D MHMM) is fitted to each image category wherein the model plays the role of extracting representative information about the images that make up the category.

In particular, the 2-D MHMM summarizes two types of information: clusters of feature vectors at multiple resolutions and the spatial relation between the clusters, both across and within resolutions. As a 2-D MHMM is estimated separately for each category, a new category of images added to the database can be profiled without repeating computation involved with learning from the existing categories. Since each image category in the training set can be manually annotated, a mapping between profiling 2-D MHMMs and sets of words can be established. For a test image, feature vectors on the pyramid grid are computed. The collection of the feature vectors are considered as an instance of a spatial statistical model. The likelihood of this instance being generated by each profiling 2-D MHMM is computed. To annotate the image, words are selected from those in the text description of the categories yielding highest likelihoods.

Many other statistical image models have been developed for various tasks in image processing and computer vision. However, because of its modeling efficiency and computational convenience, the present invention employs 2-D MHMMs as the statistical modeling approach to linguistic indexing. Although 2-D MHMMs are preferred for accomplishing the present invention, it is appreciated that other statistical modeling methods may be used without exceeding the scope as provided herein. More detail involving the feature extraction process is provided in blocks 51 through 54.

At block 51, multiple versions of the training image are obtained at different resolutions first. The original image corresponds to the highest resolution. Lower resolutions are generated by successively filtering out high frequency information. Wavelet transforms naturally provide low resolution images in the low frequency band.

Preferably, to save computation, features are often extracted from non-overlapping blocks in an image. An element in an image is therefore a block rather than a pixel. Features computed from one block at a particular resolution form a feature vector and are treated as multivariate data in the 2-D MHMM. The 2-D MHMM aims at describing statistical properties of the feature vectors and their spatial dependence. The numbers of blocks in both rows and columns reduce by half successively at each lower resolution. Obviously, a block at a lower resolution covers a spatially more global region of the image. As indicated by FIG. 3, a block at a lower resolution is referred to as a parent block, and the four blocks at the same spatial location at the higher resolution are referred to as child blocks. Such a "quad-tree" split is preferably always assumed in the sequel since the extension to other hierarchical structures is straightforward.

In the 2-D HMM, feature vectors are preferably generated by a Markov model that may change states once every block. Suppose there are M states, the state of block (i,j) being denoted by $s_{i,j}$. The feature vector of block (i,j) is $u_{i,j}$. $P(\bullet)$ is used to represent the probability of an event. Denoting $(i',j') < (i,j)$ if $i'<i$ or $i'=i, j'<j$, in which case we say that block $(i',j')$ is before block i, j. In this example, the first assumption is that $$P(s_{i,j}|\text{context}) = a_{m,n,l},$$

$$\text{context} = \{s_{i',j'}, u_{i',j'}: (i',j') < (i,j)\},$$

where $m = s_{i-1,j}$, $n = s_{i,j-1}$, and $l = s_{i,j}$. The second assumption is that given every state, the feature vectors follow a Gaussian distribution. Once the state of a block is known, the feature vector is conditionally independent of information on other blocks. It should be appreciated that the covariance matrix $\Sigma_s$ and the mean vector $\mu_s$ of the Gaussian distribution vary with state s.

The fact that only feature vectors are observable in a given image accounts for the name "Hidden" Markov Model. The state of a feature vector is conceptually similar to the cluster identity of a vector in unsupervised clustering. As with clustering, the state of a vector is not provided directly by the training data and hence needs to be estimated. In clustering, feature vectors are considered as independent samples from a given distribution. In the 2-D HMM, feature vectors are statistically dependent through the underlying states modeled by a Markov chain.

For the MHMM, the set of resolutions is denoted by $\mathfrak{R} = \{1, \ldots, R\}$, with r=R being the finest resolution. Let the collection of block indices at resolution r be $$IN^{(r)} = \{(i,j): 0 \leq i < w/2^{R-r}, 0 \leq j < z/2^{R-r}\}.$$

Images are represented by feature vectors at all the resolutions, denoted by $u_{i,j}^{(r)}$, $r \in \mathfrak{R}$, $(i,j) \in IN^{(r)}$. The underlying state of a feature vector is $s_{i,j}^{(r)}$. At each resolution r, the set of states is $\{1^{(r)}, 2^{(r)}, \ldots, M^{(r)}\}$. Note that as states vary across resolutions, different resolutions do not share states.

At block 52, the system characterizes localized features of training images using wavelets. For example, in this process an image may be partitioned into small pixel blocks. The block size is chosen to be 4×4 as a compromise between the texture detail and the computation time. It is appreciated however that other similar block sizes can also be used.

At block 54, the system extracts a feature vector of six dimensions for each block. For example, three of these features are the average color components of pixels in the block, and the other three are texture features representing energy in high frequency bands of wavelet transforms. Specifically, each of the three features is the square root of the second order moment of wavelet coefficients in one of the three high frequency bands. The features are extracted using the LUV color space, where L encodes luminance, and U and V encode color information. The LUV color space is chosen because of its good perception correlation properties.

In this example, to extract the three texture features, either the Daubechies-4 wavelet transform or the Haar transform to the L component of the image may be applied. These two wavelet transforms have better localization properties and require less computation compared to Daubechies' wavelets with longer filters. After a one-level wavelet transform, a 4×4 block is decomposed into four frequency bands. Each band contains 2×2 coefficients. Without loss of generality, suppose the coefficients in the HL band are $\{c_{k,l}, c_{k,l+1}, c_{k+1,l}, c_{k+1,l+1}\}$. One feature may then be computed as $$f = \frac{1}{2}\sqrt{\sum_{i=0}^{1}\sum_{j=0}^{1} c_{k+i,l+j}^2}.$$

The other two texture features are computed in a similar manner using the LH and HH bands, respectively.

It should be appreciated that these wavelet-based texture features provide a good compromise between computational complexity and effectiveness. It is known that moments of wavelet coefficients in various frequency bands can effectively discern local texture. Wavelet coefficients in different frequency bands signal variation in different directions. For example, the HL band reflects activities in the horizontal direction. A local texture of vertical strips thus has high energy in the HL band and low energy in the LH band.

In this example, the system automatically indexes images with linguistic terms based on statistical model comparison. FIG. 1 shows the statistical linguistic indexing process 10 as according to the present invention. For a given image I to be indexed, multi-resolution block-based features are first extracted by the same procedure 12 used to extract features for the training images.

To quantify the statistical similarity between an image I and a concept, the likelihood of the collection of feature vectors extracted from the image I is computed under the trained model 14, 14', ... 14$^N$ for the concept. All the likelihoods 16, 16', ... 16$^N$, along with the stored textual descriptions 18 about the concepts, are analyzed by the significance processor 20 to find a small set of statistically significant index terms 22 about the image I. These index terms 22 are then stored with the image I in the image database 24 for future keyword-based query processing.

Figure 2:
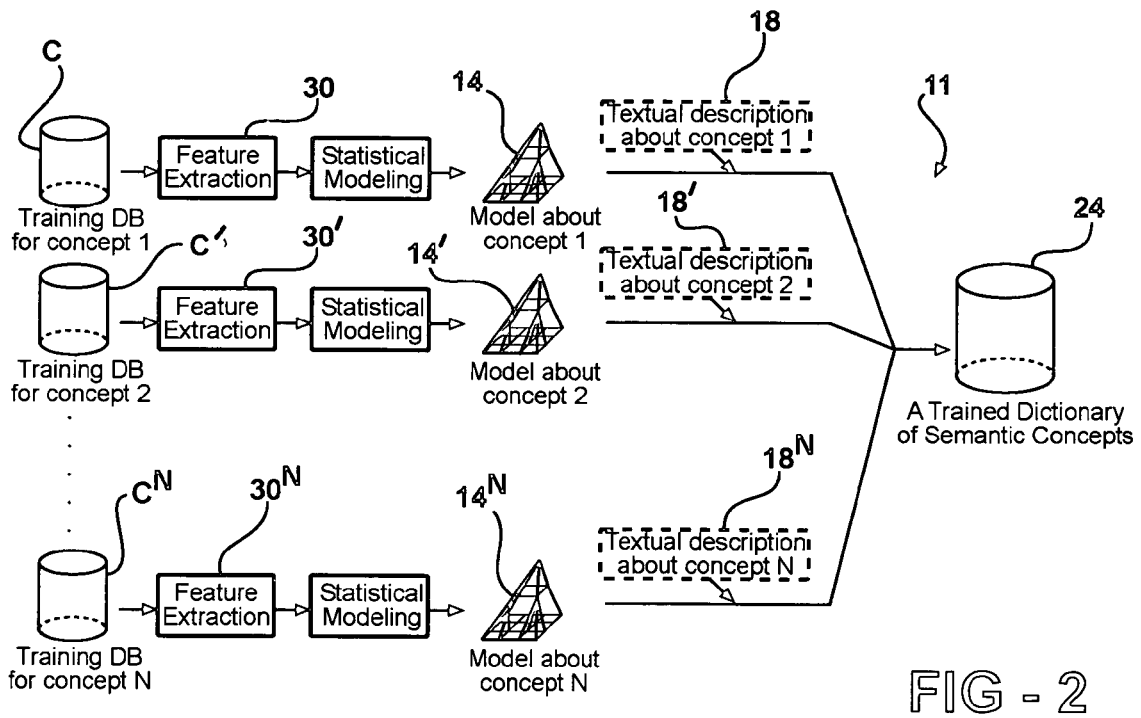
FIG. 2 illustrates a diagrammatic view of the architecture for the statistical modeling process for developing statistical models of various categories for storage in a dictionary of categories as according to the invention.

FIG. 2 illustrates the flow of the statistical modeling process 11. First, a series of concepts C, C', ... C$^N$ to be trained are manually developed for inclusion in a dictionary of concepts 24. Preferably, for each concept in this dictionary 24, a training set C, C', ... or C$^N$ containing images capturing the concept is prepared. Hence at the data level, a concept corresponds to a particular category of images. These images do not have to be visually similar. A short but informative description about any given concept in this dictionary is also manually prepared. Therefore, the present method has the potential to train a large collection of concepts because a description about each image in the training database does not need to be manually created.

Block-based features 30, 30', ... 30$^N$ are extracted from each training image at several resolutions. The statistical modeling process 11 does not depend on a specific feature extraction algorithm. The same feature dimensionality is assumed for all blocks of pixels. A cross-scale statistical model about a concept is built using training images belonging to this concept, each characterized by a collection of multi-resolution features. This model is then associated with the textual description 18, 18', ... 18$^N$ of the concept and stored in the concept dictionary 24.

The present invention focuses on building statistical models 14, 14', ... 14$^N$ using images that are pre-categorized and annotated at a categorical level. If images representing new concepts or new images in existing concepts are added into the training database, only the statistical models for the involved concepts need to be trained or retrained. Hence, the system naturally has good scalability without invoking any extra mechanism to address the issue. The scalability enables the user to train a relatively large number of concepts at once.

With the statistical model described herein, spatial relations among image pixels and across image resolutions are both taken into consideration. This property is especially useful for images with special texture patterns. Moreover, the modeling approach does not require the segmenting of images and defining a similarity distance for any particular set of features. Likelihood may be used as a universal measure of similarity. Referring again to FIG. 13, the method from block 54 to block 60.

In block 60, the multi-resolution model is trained. The method advances from block 60 to block 62 for illustrating details of the multi-resolution modeling step 60.

To structure statistical dependence among resolutions, a first-order Markov chain is assumed across the resolutions. For example, given the states at the parent resolution, the states at the current resolution may be conditionally independent of the other preceding resolutions, so that $$P\{s_{i,j}^{(r)} : r \in \mathfrak{R}, (i,j) \in IN^{(r)}\} = P\{s_{i,j}^{(1)} : (i,j) \in IN^{(1)}\}$$

$$\prod_{r=2}^{R} P\{s_{i,j}^{(r)} : (i,j) \in IN^r \mid s_{k,l}^{(r-1)} : (k,l) \in IN^{(r-1)}\}.$$

It should be appreciated that given its state $s_{i,j}^{(r)}$, a feature vector $u_{i,j}^{(r)}$ at any resolution is conditionally independent of any other states and feature vectors. As the states are unobservable, during model estimation, different combinations of states may need to be considered. An important quantity to compute is the joint probability of a particular set of states and the feature vectors. Based on the assumptions, probability can be computed by the following chain rule:

$$P\{s_{i,j}^{(r)}, u_{i,j}^{(r)} : r \in \Re, (i,j) \in IN^{(r)}\} = \quad (1)$$
$$P\{s_{i,j}^{(1)}, u_{i,j}^{(1)} : (i,j) \in IN^{(1)}\} \times$$
$$P\{s_{i,j}^{(2)}, u_{i,j}^{(2)} : (i,j) \in IN^{(2)} \mid s_{k,l}^{(1)} : (k,l) \in IN^{(1)}\} \times \ldots \times$$
$$P\{s_{i,j}^{(R)}, u_{i,j}^{(R)} : (i,j) \in IN^{(R)} \mid s_{k,l}^{(R-1)} : (k,l) \in IN^{(R-1)}\}$$

At the coarsest resolution, r=1, and feature vectors are assumed to be generated by a single resolution 2-D HMM. At a higher resolution, the conditional distribution of a feature vector given its state is assumed to be Gaussian. The parameters of the Gaussian distribution depend upon the state at the particular resolution.

Given the states at resolution r−1, statistical dependence among blocks at the finer resolution r is constrained to sibling blocks (child blocks descended from the same parent block). Specifically, child blocks descended from different parent blocks are conditionally independent. In addition, given the state of a parent block, the states of its child blocks are independent of the states of their "uncle" blocks (non-parent blocks at the parent resolution). State transitions among sibling blocks are governed by the same Markovian property assumed for a single resolution 2-D HMM. The state transition probabilities, however, depend on the state of their parent block. To formulate these assumptions, denote the child blocks at resolution r of block (k,l) at resolution r−1 may be denoted by $$DD(k,l) = \{(2k,2l), (2k+1,2l), (2k,2l+1), (2k+1,2l+1)\}.$$

According to the assumptions, $$P\{s_{i,j}^{(r)} : (i,j) \in IN^{(r)} \mid s_{k,l}^{(r-1)} : (k,l) \in IN^{(r-1)}\} =$$
$$\prod_{(k,l) \in IN^{(r-1)}} P\{s_{i,j}^{(r)} : (i,j) \in DD(k,l) \mid s_{k,l}^{(r-1)}\},$$

where $P\{s_{i,j}^{(r)}:(i,j) \in DD(k,l) \mid s_{k,l}^{(r-1)}\}$ can be evaluated by transition probabilities conditioned on $s_{k,l}^{(r)}$, denoted by $a_{m,n,l}(s_{k,l}^{(r-1)})$. Thus a different set of transition probabilities $a_{m,n,l}$ is provided for every possible state in the parent resolution. The influence of previous resolutions may be exerted hierarchically through the probabilities of the states, which is best illustrated at 14 in FIGS. 1 and 2. The joint probability of states and feature vectors at all the resolutions in Eq. (1) may then be derived using $$P\{s_{i,j}^{(r)}, u_{i,j}^{(r)} : r \in \Re, (i,j) \in IN^{(r)}\} =$$
$$P\{s_{i,j}^{(1)}, u_{i,j}^{(1)} : (i,j) \in IN^{(1)}\} \times \prod_{r=2}^{R} \prod_{(k,l) \in IN^{(r-1)}}$$
$$\left(P\{s_{i,j}^{(r)} : (i,j) \in DD(k,l) \mid s_{k,l}^{(r-1)}\} \prod_{(i,j) \in DD(k,l)} P\{u_{i,j}^{(r)} \mid s_{i,j}^{(r)}\}\right).$$

At block 62, the 2-D MHMM is estimated by the maximum likelihood criterion, such as by using an estimation algorithm (EM). The computational complexity of estimating the model depends on the number of states at each resolution and the size of the pyramid grid. Typically, the number of resolutions is 3; the number of states at the lowest resolution is 3; and those at the two higher resolutions are 4.

Figure 4:
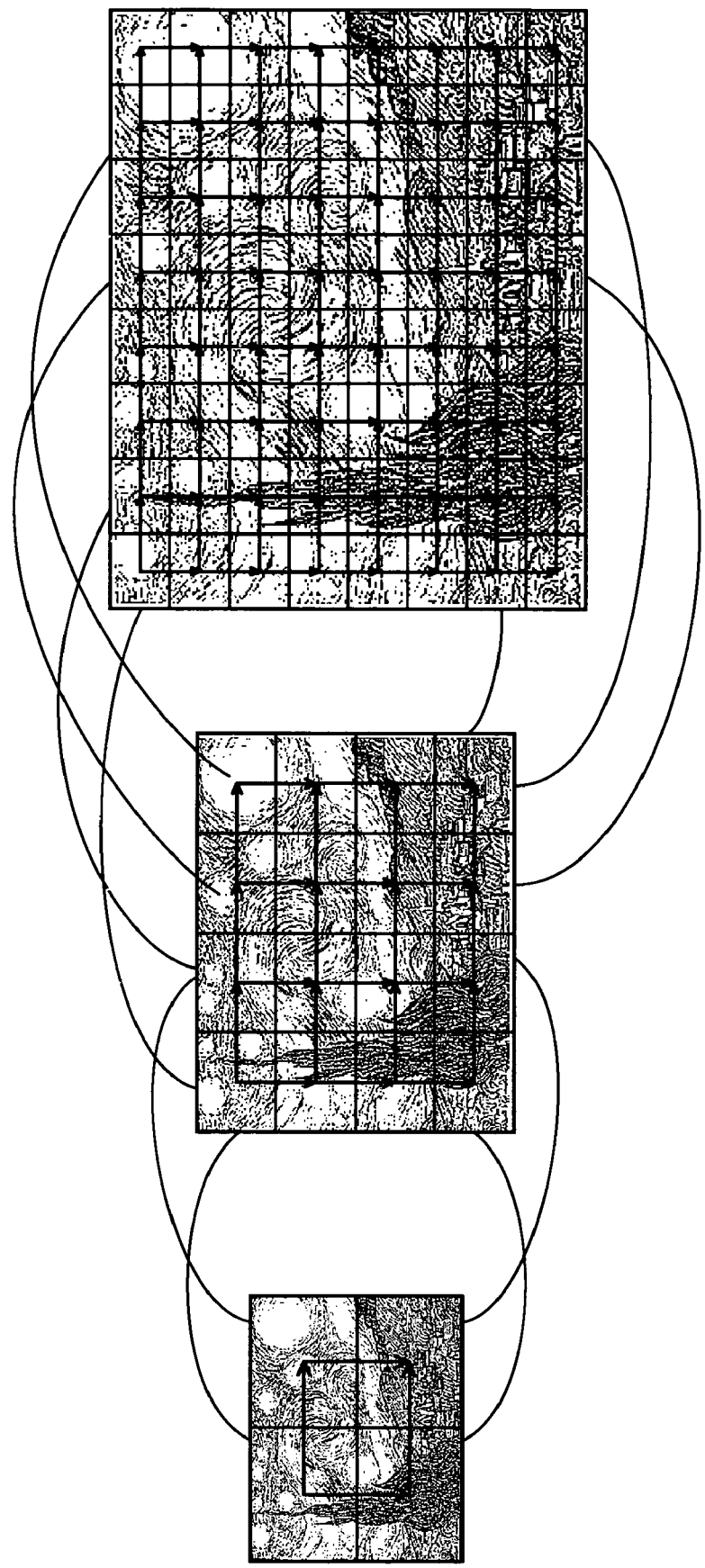
FIG. 4 illustrates a diagrammatic view of the spatial relations among image pixels and across image resolutions that are considered during the statistical modeling process as according to the invention.

To summarize, a 2-D MHMM captures both the inter-scale and intra-scale statistical dependence. The inter-scale dependence is modeled by the Markov chain over resolutions. The intra-scale dependence is modeled by the HMM. At the coarsest resolution, feature vectors are assumed to be generated by a 2-D HMM. FIG. 4 illustrates the inter-scale and intra-scale dependencies model. At all the higher resolutions, feature vectors of sibling blocks may also be assumed to be generated by 2-D HMMs. The HMMs vary according to the states of parent blocks. Therefore, if the next coarser resolution has M states, then there are, correspondingly, M HMMs at the current resolution. Referring again to FIG. 13, the method advances from block 62 to block 64. At block 64, the trained model is assigned a textual description and stored in the system. Referring again to FIG. 13, the methodology advances to block 70.

In block 70, the system compares a given image statistically with the trained models in the concept dictionary and extracts the most statistically significant index terms to describe the image. The methodology advances to block 72.

In block 72, a collection of feature vectors at multiple resolutions $$\{u_{i,j}^{(r)}, r \in \Re, (i,j) \in IN^{(r)}\}$$

is computed in a given image.

$$\{u_{i,j}^{(r)}, r \in \Re, (i,j) \in IN^{(r)}\}$$

is regarded as an instance of a stochastic process defined on a multi-resolution grid. At block 74, the similarity between the image and a category of images in the database is assessed, such as by using the log likelihood of this instance under the model M trained from images in the category, that is, $$\log P\{u_{i,j}^{(r)}, r \in \Re, (i,j) \in IN^{(r)} \mid M\}.$$

Preferably, a recursive algorithm is used to compute the above log likelihood. After determining the log likelihood of the image belonging to any category, the log likelihoods are sorted to find the few categories with the highest likelihoods at block 76. Suppose k top-ranked categories are used to generate annotation words for the query. The selection of k may be somewhat arbitrary. One example of an adaptive technique to decide k is to use categories with likelihoods exceeding a predetermined threshold. However, it is found that the range of likelihoods computed from a query image may vary greatly, depending on the category the image belongs to. A fixed threshold may not be useful. When there are a large number of categories in the database, it is observed that choosing a fixed number of top-ranked categories tends to yield relatively robust annotation.

At block 78, words in the description of the selected k categories are used as candidates for annotating the query image. If a short description for the query is desired, a certain mechanism may be required to choose a subset of words. There are many possibilities. The system may optionally provide multiple choices for selecting words with only negligible increase in computational load, especially in comparison with the amount of computation needed to obtain likelihoods and rank them. For example, suppose in the annotation of the k categories, a word appears j times. If the supposition that the k categories are chosen randomly based on the number of times the word arises is rejected, then confidence is gained in that the k categories are chosen because of similarity with the query. To reject the hypothesis, the probability of the word appearing at least j times in the annotation of k randomly selected categories is computed. A small probability indicates it is unlikely that the word has appeared simply by chance. Denote this probability by P(j,k) where:

$$P(j,k) = \sum_{i=j}^{k} I(i \le m) \frac{\binom{m}{i}\binom{n-m}{k-i}}{\binom{n}{k}}$$

$$= \sum_{i=j}^{k} I(i \le m) \frac{m!(n-m)!k!(n-k)!}{i!(m-i)!(k-i)!(n-m-k+i)!n!},$$

and I(•) is an indicator function that equals 1 when the argument is true and 0 otherwise, n is the total number of image categories in the database, and m is the number of image categories that are annotated with the given word. The probability P(j,k) can be approximated as follows, using the binomial distribution if n,m>>k:

$$P(j,k) = \sum_{i=j}^{k} \binom{k}{i} p^i (1-p)^{k-i} = \sum_{i=j}^{k} \frac{k!}{i!(k-i)!} p^i (1-p)^{k-i},$$

where p=m/n is the percentage of image categories in the database that are annotated with this word, or equivalently, the frequency of the word being used in annotation. A small value of P(j,k) indicates a high level of significance for a given word. Words are ranked within the description of the most likely categories according to their statistical significance. Most significant words are used to index the image at block 80 of FIG. 13, where statistically significant terms are assigned to the image to be indexed.

Intuitively, assessing the significance of a word by P(j,k) essentially quantifies how surprising it is to see the word. Words may have vastly different frequencies of being used to annotate image categories in a database. For instance, many more categories may be described by "landscape" than by "dessert". Therefore, obtaining the word "dessert" in the top ranked categories matched to an image is in a sense more surprising than obtaining "landscape" since the word "landscape" may have a good chance of being selected even by random matching.

The proposed scheme of choosing words favors "rare" words. Hence, if the annotation is correct, it tends to provide relatively specific or interesting information about the query. On the other hand, the scheme is risky since it tens to avoid using words that fit a large number of image categories. The methodology ends at block 82.

An example of the present invention is described wherein the components of the ALIP system can be implemented and tested with a general-purpose image database including about 60,000 photographs. These images may be stored in JPEG format with size 384×256 or 256×384. The system may be written in the C programming language and compiled on two UNIX platforms: LINUX and Solaris. It is appreciated, however, that other programming languages may be utilizes for the intended purpose without exceeding the scope of the invention.

The system can be trained using a subset of 60,000 photographs based on 600 CD-ROMs, such as those published by COREL Corp. Typically, each COREL CD-ROM of about 100 images represents one distinct topic of interest. Images in the same CD-ROM are often not all visually similar. FIG. 5A shows images that may be used to train the concept of Paris/France with the description: "Paris, European, historical building, beach, landscape, water". Images that can be used to train the concept male are shown in FIG. 5B. For the experiment, the dictionary of concepts contains all 600 concepts, each associated with one CD-ROM of images.

A set of keywords can be manually assigned to describe each CD-ROM collection of 100 photographs. The descriptions of these image collections range from as simple or low-level as "mushrooms" and "flowers" to as complex or high-level as "England, landscape, mountain, lake, European, people, historical building" and "battle, rural, people, guard, fight, grass". On average, 3.6 keywords are preferably used to describe the content of each of the 600 image categories. FIG. 6 provides a table of example category descriptions.

While manually annotating categories, efforts to use words that properly describe nearly all, if not all images in one category, are preferably selected. It is possible that a small number of images may not described accurately by all words assigned to their category. These small number of images can be referred to as "outliers", and introduced into training for the purpose of estimating the 2-D MHMM. There are ample statistical methods to suppress the adverse effect of them. On the other hand, keeping outliers in training can testify the robustness of a method. With the present invention, the number of parameters is small relative to the amount of training data. Hence the model estimation is not anticipated to be affected considerably by inaccurately annotated images.

To provide numerical results on the performance, the system can be evaluated based on a controlled subset of the COREL database, formed by 10 image categories including African people and villages, beach, buildings, buses, dinosaurs, elephants, flowers, horses, mountains and glaciers, and food, each containing 100 pictures. In further testing, categorization and annotation results may be provided with 600 categories. Because many of the 600 categories share semantic meanings, the categorization accuracy is conservative for evaluating the annotation performance. For example, if an image of the category with scenes in France is categorized wrongly into the category with European scenes, the system is still useful in many applications. Within this controlled database, annotation performance can be reliably assessed by categorization accuracy because the tested categories are distinct and share no description words.

Figures 7, 8:
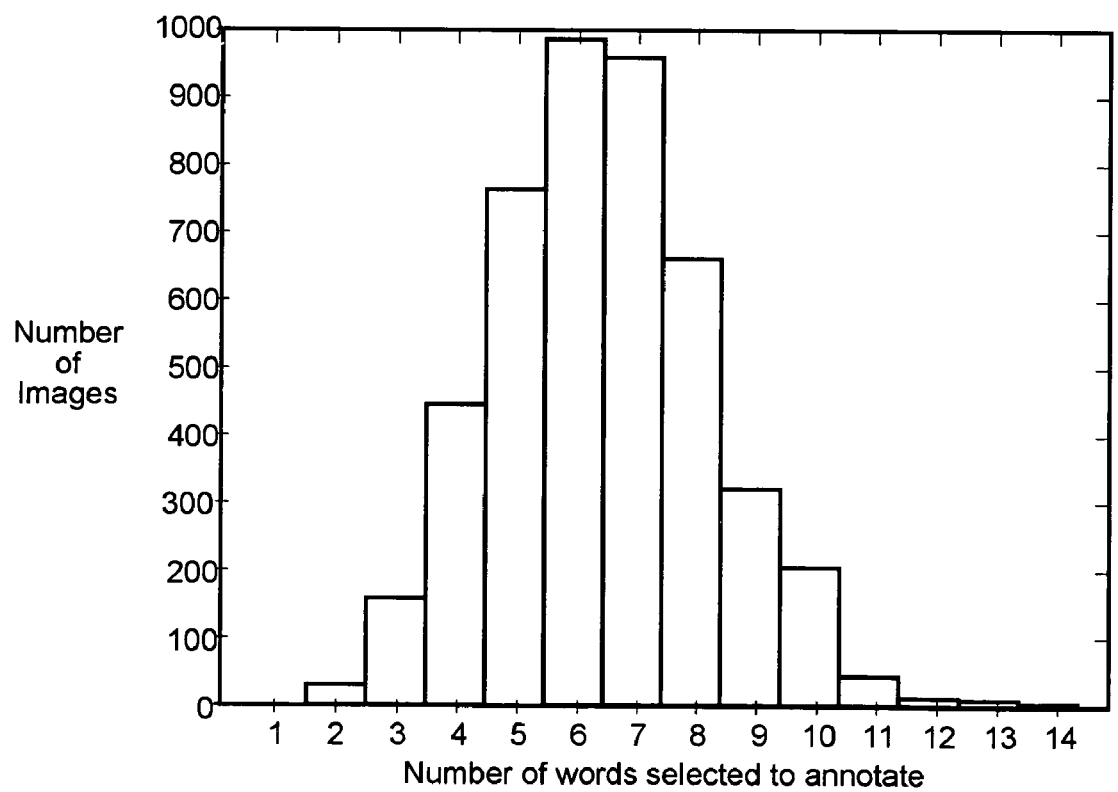
FIG. 7 illustrates a percentage table which depicts the accuracy of the automatic linguistic imaging system as according to the invention.
FIG. 8 illustrates a histogram of the numbers of words assigned to test images as according to the invention.

Each concept may be trained using 40 images and tested on models using 500 images outside the training set. Instead of annotating the images, the program may be used to select the category with the highest likelihood for each test image. That is, the classification power of the system is an indication of the annotation accuracy. An image is considered to be annotated correctly if the computer predicts the true category the image belongs to. Although these image categories do not share annotation words, they may be semantically related. For example, both the "beach" and the "mountains and glaciers" categories contain images with rocks, sky, and trees. Therefore, the evaluation method used here only provides a lower bound for the annotation accuracy of the system. FIG. 7 shows the automatic classification result. Each row lists the percentage of images in one category classified to each of the 10 categories by the computer. Numbers on the diagonal show the classification accuracy for every category.

A statistical model is preferably trained for each of the 600 categories of images. Depending on the complexity of a category, the training process could take between 15 to 40 minutes of CPU time, with an average of 30 minutes, on an 800 MHz Pentium III PC to converge to a model. These models can be stored in a fashion similar to a dictionary or encyclopedia. The training process is entirely parallelizable because the model for each concept is estimated separately.

Illustratively, 4,630 test images outside the training image database may be randomly selected and processed using the linguistic indexing component of the system 10. For each of these test images, the computer program selects 5 concepts in the dictionary with the highest likelihoods of generating the image. For every word in the annotation of the 5 concepts, the value indicating its significance, is computed. The median of all these values is 0.0649. The median is used as a threshold to select annotation words from those assigned to the 5 matched concepts. In this case, a small value implies high significance. Hence a word with a value below the threshold is selected. For each word in the annotation of the 5 matched categories, a value indicating its significance is computed and thresholded by 0.0649.

A histogram of the numbers of words assigned to the test images is illustratively provided in FIG. 8. These numbers range from 1 to 14 with median 6. The unique image with only one word assigned to it is shown in FIG. 9(A). This image is automatically annotated by "fractal", while the manual description of its category contains two words: "fractal" and "texture". There are two images annotated with as many as 14 words, which are shown in FIGS. 9(B) and (C). For the first image, FIG. 9B, the manual annotation contains "mountain", "snow", "landscape"; and the automatically assigned words are "mountain", "Rockies", "snow", "ice", "glacier", "sky", "ski", "winter", "water", "surf", "up", "boat", "ship", "no-fear". The only word discarded by thresholding is "cloud" which would be a good description of the image although not included in the manual annotation. The value indicating its significance is 0.073, quite close to the threshold. Several words outside the manual annotation in fact describe the image quite accurately, e.g., "Rockies", "glacier", "sky". This example shows that the computer annotation can sometimes be more specific than the manual annotation which tends to stay at a general level in order to summarize all the images in the category. For the second image, as shown in FIG. 9C, the manual annotation includes "season", "landscape", "autumn", "people", and "plant". The word "autumn" used to annotate the category is not very appropriate for this particular image. The automatically annotated words have no overlap with the manual annotation. The word "people" is marginally discarded by thresholding. Other words assigned to this images include "sport", "fitness", "fight". However, several words which may be assigned to this image may be about human activities, e.g., "sport", "fitness", "fight", and hence imply the existence of "people".

To quantitatively assess the performance, the accuracy of categorization for the randomly selected test images may be computed first, and then compared to the annotation system with a random annotation scheme. Although the ultimate goal of ALIP is to annotate images linguistically, presenting the accuracy of image categorization helps to understand how the categorization supports this goal. Due to the overlap of semantics among categories, it is important to evaluate the linguistic indexing capability. Because ALIP's linguistic indexing capability depends on a categorized training database and a categorization process, the choice of annotation words for the training image categories may improve the usefulness of the training database. The experimental results illustrated above show that both ALIP's image categorization process and linguistic indexing process can provide good accuracy.

The accuracy of categorization may be evaluated in the same manner above. In particular, for each test image, the category yielding the highest likelihood is identified. If the test image is included in this category, we call it a "match". The total number of matches for the 4,630 test images is 550. That is, an accuracy of 11.88% is achieved. In contrast, if random drawing is used to categorize the images, the accuracy is only 0.17%. If the condition of a "match" is relaxed to having the true category covered by the highest ranked categories, the accuracy of ALIP increases to 17.06%, while the accuracy for the random scheme increases to 0.34%.

Figures 9, 10:
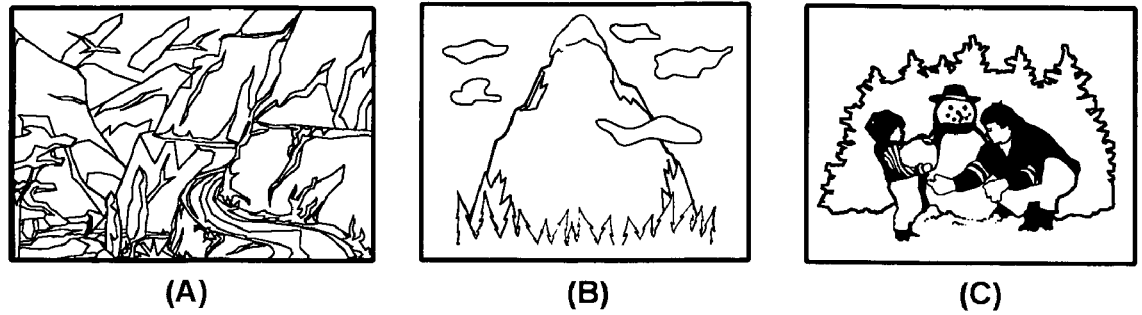
FIG. 10 illustrates a table of comparison between the performance of the present invention and a random annotation method of linguistic indexing of images.
Figure 11A:
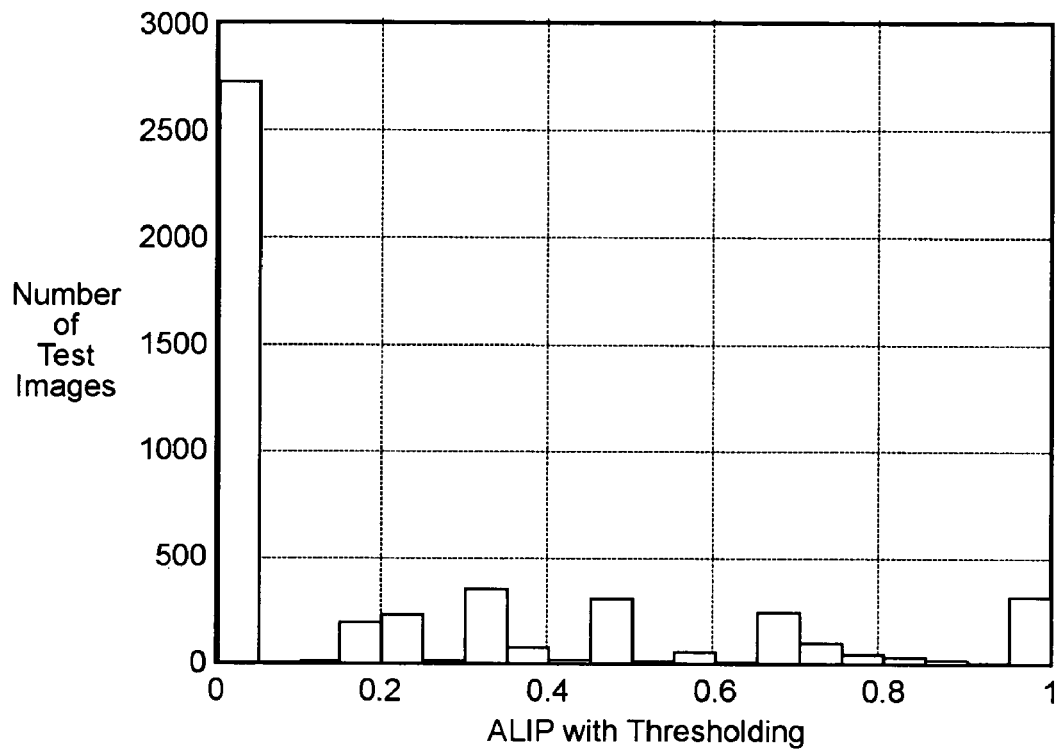
FIGS. 11A-11D illustrate histograms of the coverage percentages obtained by the present invention and a random annotation method of linguistic indexing of images.
Figure 11B:
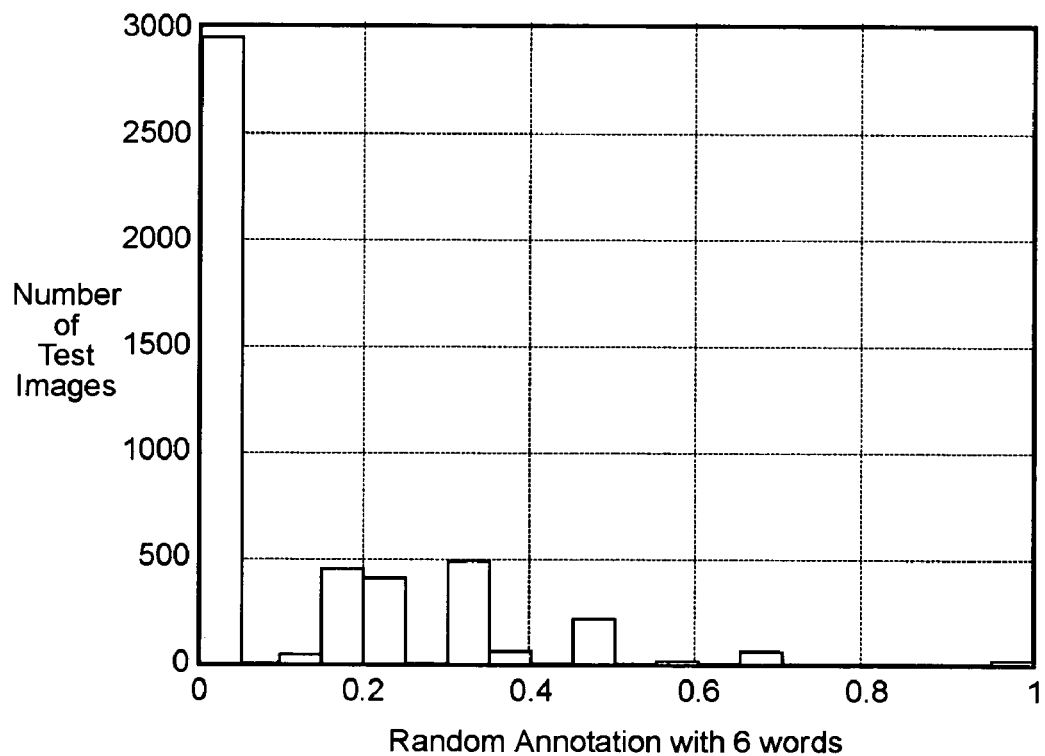
Figure 11C:
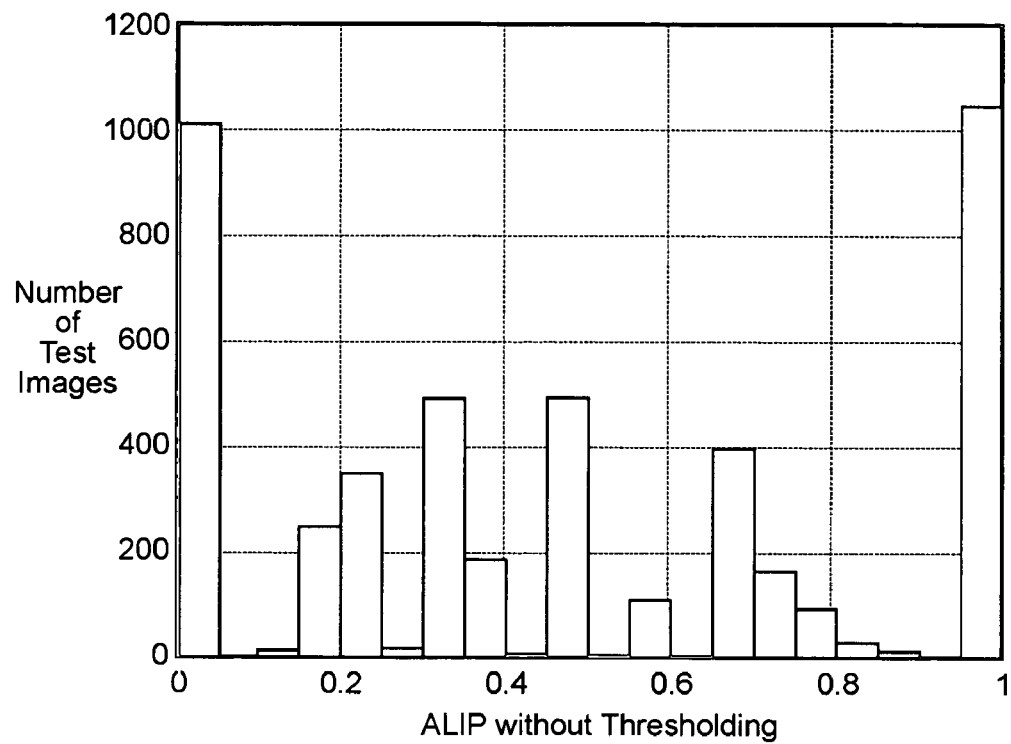
Figure 11D:
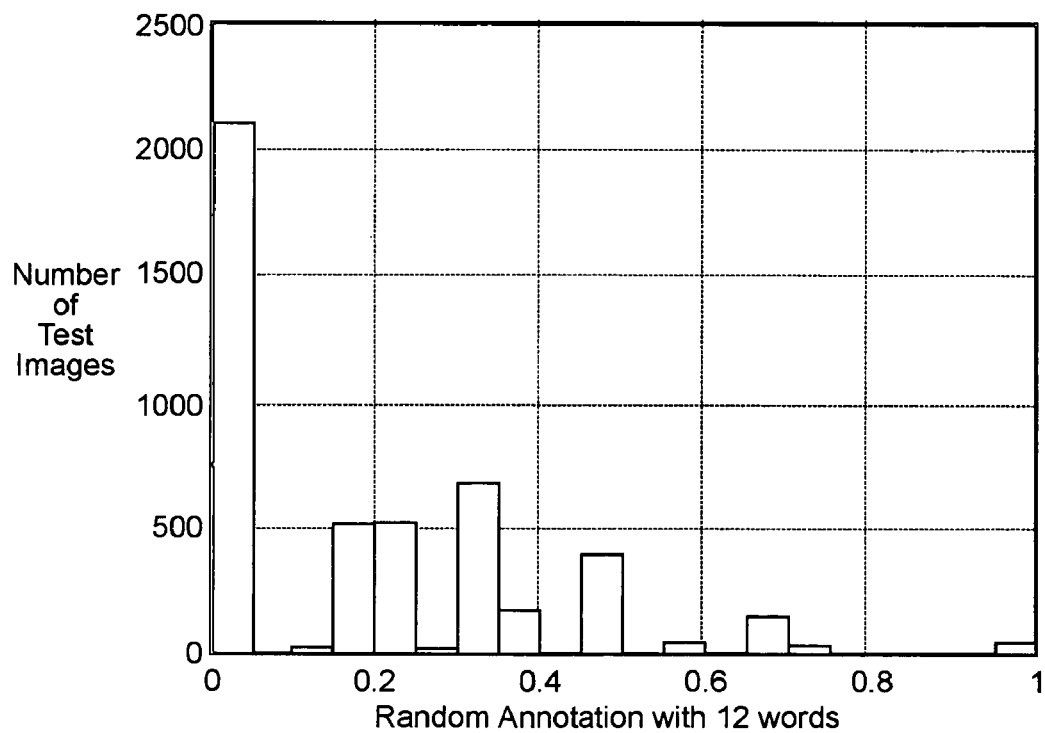

FIG. 10 illustratively shows the percentage of images whose true categories are included in their corresponding top-ranked k (k=1, 2, ..., 5) categories in terms of likelihoods computed by ALIP. As a comparison, the number of categories required to cover the true category at the same accuracy using random selection is computed. When m categories are randomly selected from 600 categories, the probability that the true category is included in the m categories is $$\frac{m}{600}$$

(derived from sampling without replacement). Therefore, to achieve an accuracy of 11.88% by the random scheme, 72 categories must be selected. FIG. 10 shows details about the comparison. Comparison between the image categorization performance of ALIP and that of a random selection scheme. Accuracy is the percentage of test images whose true categories are included in top-ranked categories. ALIP requires substantially fewer categories to achieve the same accuracy.

To compare with the random annotation scheme, all the words in the annotation of the 600 categories may be pooled to compute their frequencies of being used. The random scheme selects words independently according to the marginal distribution specified by the frequencies. To compare with words selected by our system using the 0.0649 threshold, 6 words may be randomly generated for each image. The number 6 is the median of the numbers of words selected for all the images by our system, and is considered as a fair value to use. The quality of a set of annotation words for a particular image is evaluated by the percentage of manually annotated words that are included in the set, referred to as the coverage percentage. It is appreciated that this way of evaluating the annotation performance may be pessimistic, because the system may provide accurate words that are not included in the manual annotation. An intelligent system tends to be punished more by the criterion, in comparison with a random scheme because among the words not matched with manually assigned ones, some may well be proper annotation. In this example, the mean coverage percentage is 21.63%, while that of the random scheme is 9.93%. If all the words in the annotation of the 5 matched concepts are assigned to a query image, the median of the numbers of words assigned to the test images is 12. The mean coverage percentage is 47.48%, while that obtained from assigning 12 words by the random scheme is 17.67%. The histograms of the coverage percentages obtained by our system with and without thresholding and the random scheme are compared in FIGS. 11A-11D.

One may suspect that the 4,630 test images, despite of being outside the training set, are rather similar to training images in the same categories, and hence are unrealistically well annotated. The annotation of 250 images, taken from 5 categories in the COREL database, using only models trained from the other 595 categories, i.e., no image in the same category as any of the 250 images is used in training, was examined. The mean coverage percentages obtained for these images with and without thresholding at 0.0649 are 23.20% and 48.50%, both slightly higher than the corresponding average values for the previous 4,630 test images. The mean coverage percentages achieved by randomly assigning 6 and 12 words to each image are 10.67% and 17.27%. It is thus demonstrated that for these 250 images, relying merely on models trained for other categories, the annotation result is at least as good as that of the large test set.

It takes an average of 20 minutes of CPU time to compute all the likelihoods of a test image under the models of the 600 concepts. The computation is highly parallelizable because processes to evaluate likelihoods given different models are independent. The average amount of CPU time to compute the likelihood under one model is only 2 seconds.

Figure 12:
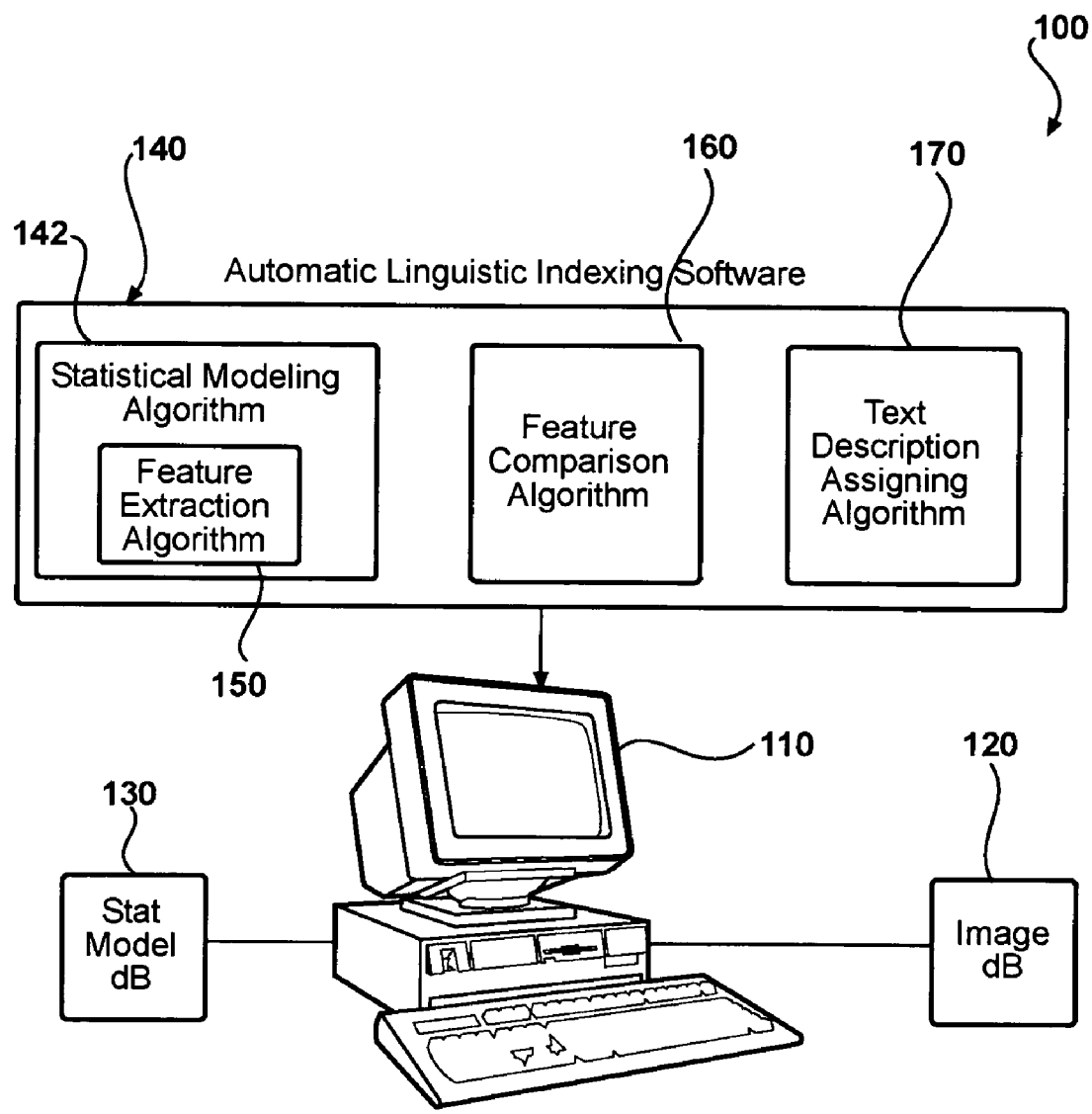
FIG. 12 illustrates a block diagrammatic view of the automatic linguistic indexing system components as according to the invention.
Figure 13:
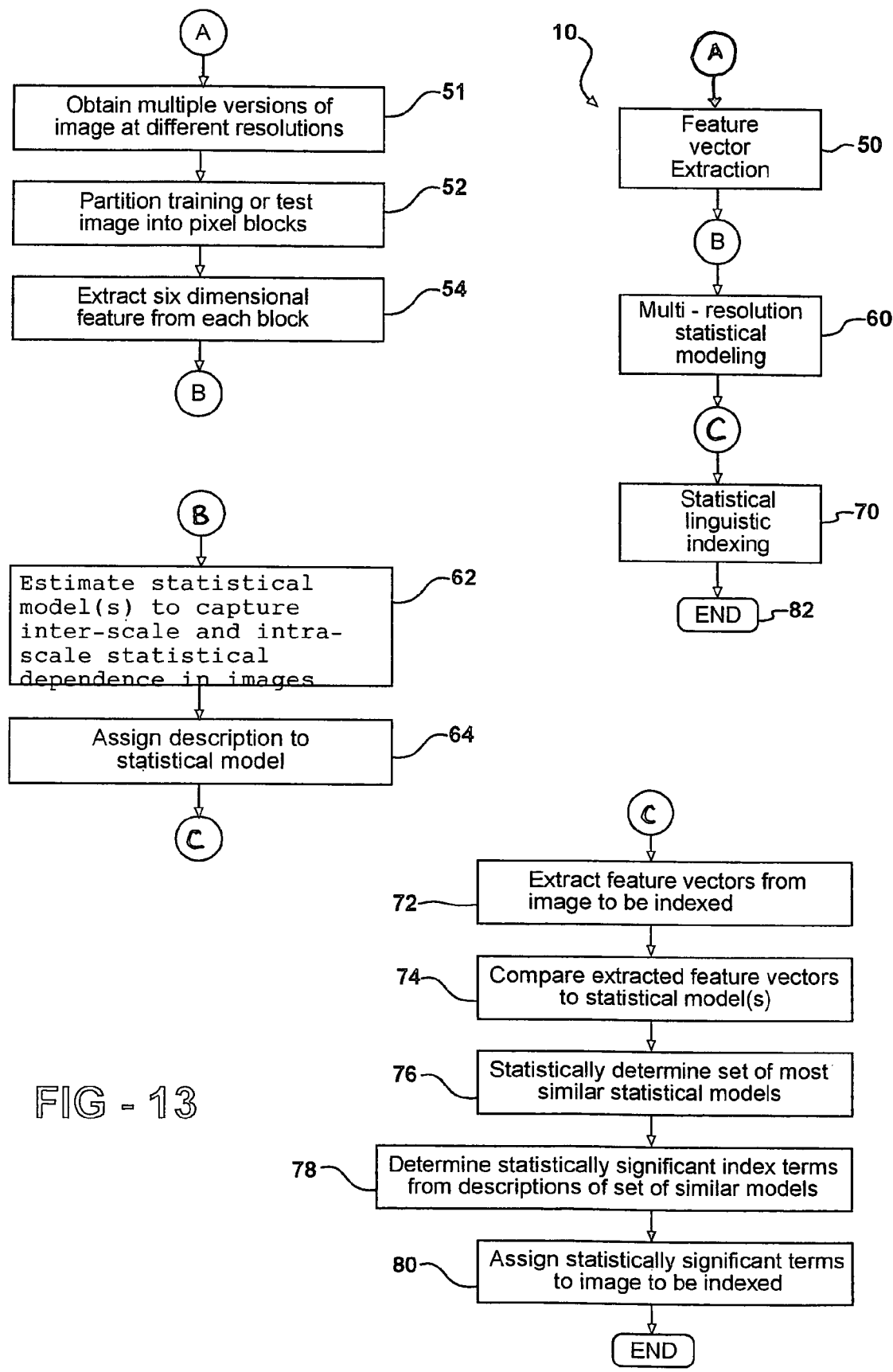
FIG. 13 illustrates a block a diagrammatic view of the automatic linguistic indexing method as according to the invention.
Figure 14:
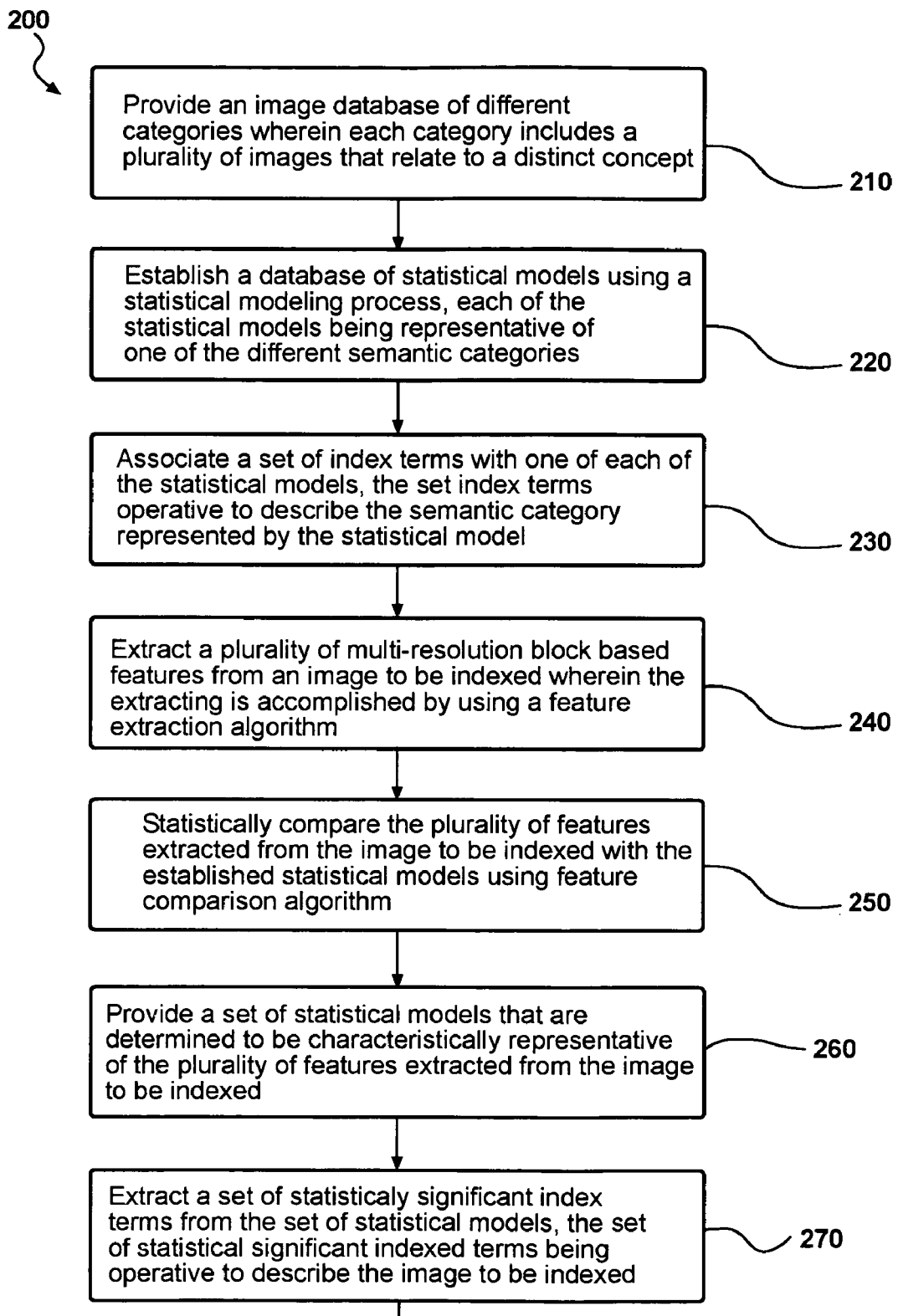
FIG. 14 generally illustrates a process flow diagram of the automatic linguistic indexing method as according to the invention.

Referring now to FIG. 12, a block diagrammatic view of components of the automatic linguistic indexing system used to implement the methodology of FIGS. 13 and 14 is illustrated at 100. As illustrated, the system 100 preferably includes a computer 110 operative to receive images to be assigned a textual description. The computer essentially being comprised of a processor, a database, memory, I/O interfaces and a monitor. The input means for receiving such image may be illustratively provided via the download from an Internet connection, peripheral devices such as CD-ROMs or floppy drives, digital cameras, scanners, or the like.

An image database is provided in communication with the computer 110 for storing a plurality of different semantic categories wherein each category is preferably associated with a predetermined textual description that operates to describe at least a portion of the category it is associated with.

A second database 130 is provided in communication with the computer 110 for storing at least one statistical model that represents at least one semantic category disposed within the image database 120. Although not illustrated, a single database may be appropriately partitioned to store both the image database and statistical model database.

It is appreciated that the computer 110 is disposed with automatic linguistic indexing application software 140 for accomplishing the image indexing process as according to the invention. Essentially, the application software 140 includes a statistical modeling algorithm portion 142 operative to construct a statistical model representative of at least one of the different semantic categories disposed in the image database 120. The statistical modeling algorithm 142 preferably includes a feature extraction algorithm 150 operative to extract feature records from an image to be indexed as described above. Optionally, the feature extraction algorithm 150 may be provided independent of the statistical modeling algorithm however, without exceeding the scope of the invention.

The application software 140 also includes a feature comparison algorithm portion 160 operative to statistically compare features extracted from an image to be indexed with at least one statistical model disposed in the model database 130 to determine statistical similarities between the image and the statistical model stored in the database 130. The feature comparison algorithm 160 is further operative to extract a set of statistical models from the model database 130, wherein the set of statistical models extracted from the database 130 are the most similar to the features extracted from the image to be indexed.

Finally, a text assigning algorithm 170 is provided and operative to extract a set of statistically significant index terms from the predetermined textual descriptions associated with the set of statistical models extracted from the database 130. The set of index terms compiled by the text assigning algorithm 130 are operative to provide the textual description of the image to be indexed in the image database 120.

Referring now to FIG. 14, a process flow diagram for the automatic linguistic indexing system 10 is generally illustrated at 200. The training process is generally described in blocks 210 through 230. At 210, the process begins with providing an image database of different semantic categories wherein each category includes a plurality of images that relate to a distinct concept. The database may be provided as part of a local area network or at a remote location being provided in communication with a user interface via wireless or wire connections as known to those skilled in the art.

The process continues at 220 with establishing a database of statistical models using a statistical modeling algorithm as described above wherein the model is operative to represent at least one of the different concepts stored in the image database. Next at 230, a set of index terms is associated with each of the statistical models for providing a global description of the images that comprise the semantic category or distinct concept represented by the statistical model. After training is completed, the system 10 is primed for linguistic indexing of test images as generally described in blocks 240 through 270.

At 240 the process continues with the extraction of a plurality of multi-resolution block base features from the image to be indexed as described above. Preferably, the same statistical modeling process described above for establishing the database of statistical models at 220 is used as the means for extracting feature vectors from the image to be indexed.

Next, the plurality of features extracted from the image to be indexed are statistically compared to the statistical model stored in the model database 220 to determine the statistical similarities that exist between the image and each model within the database.

If a model is determined to be similar to the image to be indexed, the model is stored within a set of statistical models that are the most similar to the image to be indexed relative to the other models stored in the database 220 (see 260).

The system 10 operates to ensure that every established model in the database 220 is compared to the image to be indexed. After all models have been compared, a set of statistically significant index terms is extracted from the set of statistical models that were determined to be the most similar to the image to be indexed as described at 270. Accordingly, this set of index terms is thereafter associated with the image which can then become a part of the image database 210.

From the foregoing, it can be seen that the present invention provides a method and system to accomplish the automatic linguistic indexing of pictures by a statistical modeling approach. It is appreciated however that one skilled in the art upon reading the specification will appreciate changes and modifications that do not depart from the spirit of the invention as defined by the scope of the appended claims.

We claim:

1. A method for automatic linguistic indexing of images, said method comprising the steps of:
   establishing a database of statistical models using a statistical modeling process, wherein the database is accessible by the computer, and each of the statistical models represents a predetermined semantic category;
   associating a set of index terms with each statistical model in the database, wherein the set of index terms provides a description for the predetermined semantic category;
   extracting a plurality of feature vectors from an image to be indexed;
   statistically comparing the plurality of feature vectors extracted from the image to be indexed to the statistical models in the database;
   determining a set of statistical models from the database that are statistically similar to the plurality of feature vectors extracted from the image to be indexed; and
   extracting a set of statistically significant index terms from the descriptions of the set of statistical models and using the set of statistically significant indexed terms to index the image.

2. The method of claim 1 further comprising the step of providing an image database of different semantic categories accessible by a computer wherein each category includes at least one image that relates to a predetermined concept.

3. The method of claim 1 wherein the step of extracting the plurality of feature vectors further includes the step of using a feature extraction algorithm.

4. The method of claim 3 wherein the step of extracting the plurality of feature vectors further includes the step of partitioning the image into a plurality of pixel blocks.

5. The method of claim 4 wherein the step of extracting the plurality of feature vectors further includes the step of extracting a six-dimensional feature vector from each of the pixel blocks.

6. The method of claim 1 wherein the step of statistically comparing the plurality of feature vectors further includes the step using a feature comparison algorithm to compare the extraction feature vectors to the statistical models.

7. The method of claim 1 wherein the step of extracting the set of statistically significant index terms further includes the step of using a significance processor to analyze the set of statistical models and the associated set of index terms to determine the set of statistically significant index terms.

8. The method of claim 1 wherein the step of extracting the plurality of feature vectors further includes the step of extracting multi-resolution block-based features.

9. The method of claim 1 wherein the step of establishing the database of statistical models further includes the step of creating a statistical model using a two-dimensional multi-resolution hidden Markov modeling.

10. The method of claim 1 wherein the step of associating the set of index terms with the statistical model further includes the step of associating index terms with the statistical models.

11. The method of claim 1 wherein the step of providing the set of statistical models further includes the step of providing the set of statistical models from statistical models that exceed a predetermined statistical likelihood.

12. The method of claim 1 wherein the step of extracting the set of statistically significant index terms further includes the step of selecting a set of statistically significant index terms that are included in the descriptions of the set of statistical models and are below a predetermined statistical threshold.

13. A method of automatic linguistic indexing of images using a computer system, said method comprising the steps of:
   generating a training image database having a plurality of training images wherein the plurality of training images represent at least one semantic category;
   assigning a textual description to the at least one semantic category in the training database;
   extracting a plurality of feature vectors from the training images using a statistical modeling process;
   generating statistical models using the extracted feature vectors, wherein the statistical models are associated with portions of the textual description assigned to the at least one category and including a plurality of paths, each of the plurality of paths representing a variation of the training images;
   storing the statistical models; and
   using the stored models to index and assign a textual description to an image by statistically comparing the models with a plurality of features extracted from the image to be indexed to determine the statistical similarity between the image and each model.

14. The method of claim 13 wherein the step of extracting the plurality of feature vectors further includes the step of extracting multi-resolution block-based features.

15. The method of claim 13 wherein the step of generating the statistical model further includes the step of using two-dimensional multi-resolution hidden Markov modeling.

16. The method of claim 13 wherein the step of associating the set of index terms with the statistical model further includes the step of manually associating index terms with the statistical model.

17. The method of claim 13 wherein the step of providing the set of statistical models further includes the step of providing the set from statistical models that exceed a predetermined statistical likelihood.

18. The method of claim 13 wherein the step of assigning the description to the image further includes the step of providing the description from a set of statistically significant index terms that are below a statistical threshold.

19. A computer system for use in automatic linguistic indexing of images, said system comprising:
   a computer operative to receive an image to be indexed and assigned a textual description;
   a plurality of different semantic categories disposed on said computer;
   a statistical modeling algorithm operative to construct a statistical model representative of each one of said plurality of different semantic categories;
   a database in communication with said computer for storing said plurality of different semantic categories and said statistical models, each of said different semantic categories and said statistical models having a predetermined textual description associated therewith;
   a feature extraction algorithm operative to extract a plurality of feature vectors from the image to be indexed;
   a feature comparison algorithm operative to statistically compare said plurality of feature vectors extracted from the image with each of said statistical models to determine statistical similarity between the image and each of said statistical models; and
   a text assigning algorithm operative to extract a set of statistically significant index terms from said predetermined textual descriptions associated with said statistical models wherein said set of index terms provide the textual description for the image to be indexed.

20. The system of claim 19 wherein said feature comparison algorithm is further operative to extract a set of statistical models from said statistical models wherein said extracted set of statistical models are most similar to said extracted feature vectors.

21. The system of claim 20 wherein said set of statistically significant index terms is extracted from said set of statistical models.

22. The system of claim 19 wherein said database is remotely located from said computer.

23. The system of claim 19 wherein said computer and said database are in communication via the Internet.

24. The system of claim 19 wherein said extracted features are multi-resolution block-based features extracted using said feature extraction algorithm.

25. The system of claim 19 wherein said set of statistical models include statistical models corresponding to a predetermined statistical likelihood.

26. The system of claim 19 wherein the set of statistically significant index terms are selected from the predetermined textual descriptions associated with the statistical models and are below a predetermined statistical threshold.

* * * * *